J. W. GRAVES.
COTTON GIN.
APPLICATION FILED FEB. 28, 1906.
1,118,413.
Patented Nov. 24, 1914.
4 SHEETS—SHEET 1.
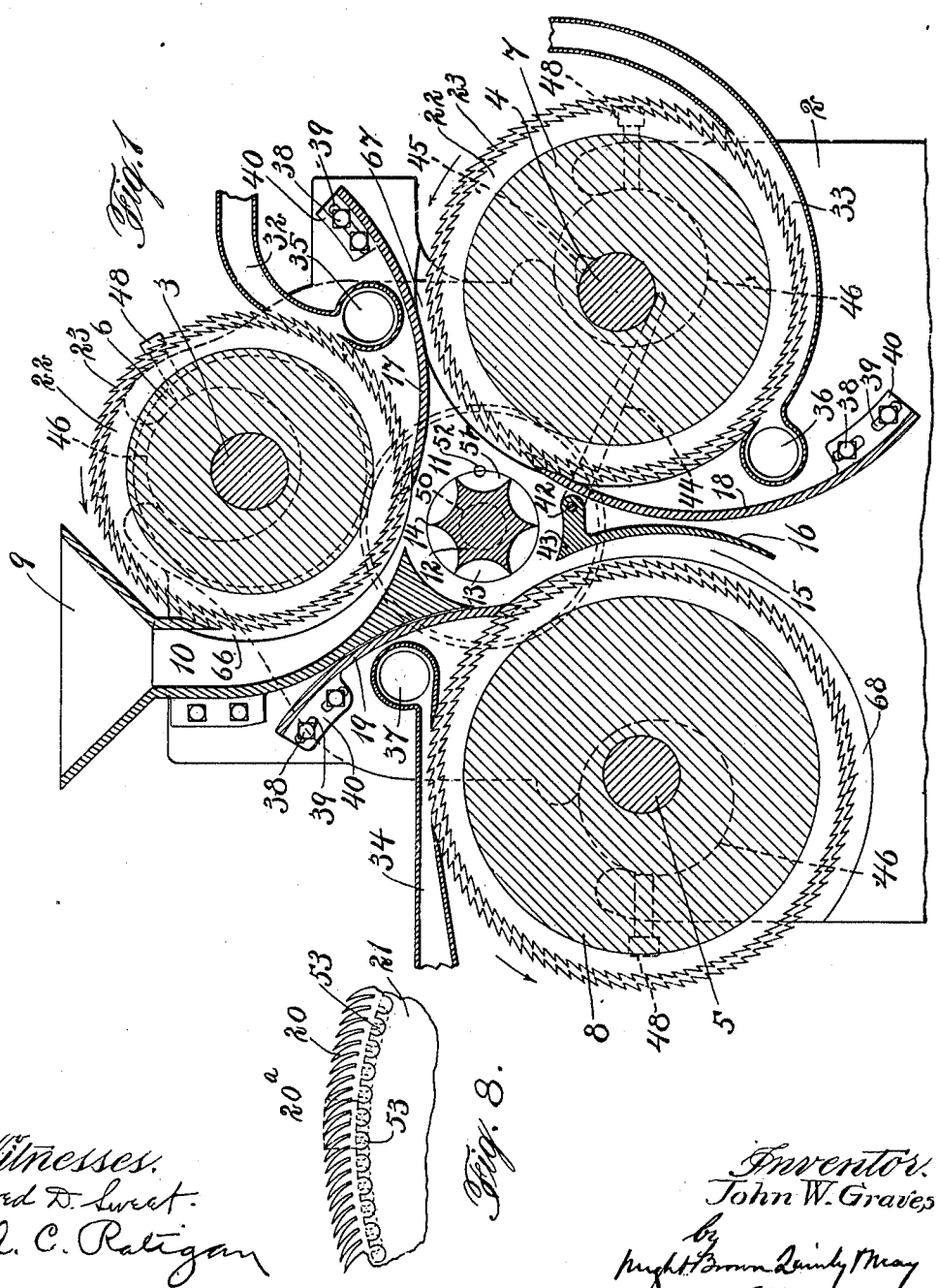

J. W. GRAVES.
COTTON GIN.
APPLICATION FILED FEB. 28, 1906.
1,118,413.
Patented Nov. 24, 1914.
4 SHEETS—SHEET 2.
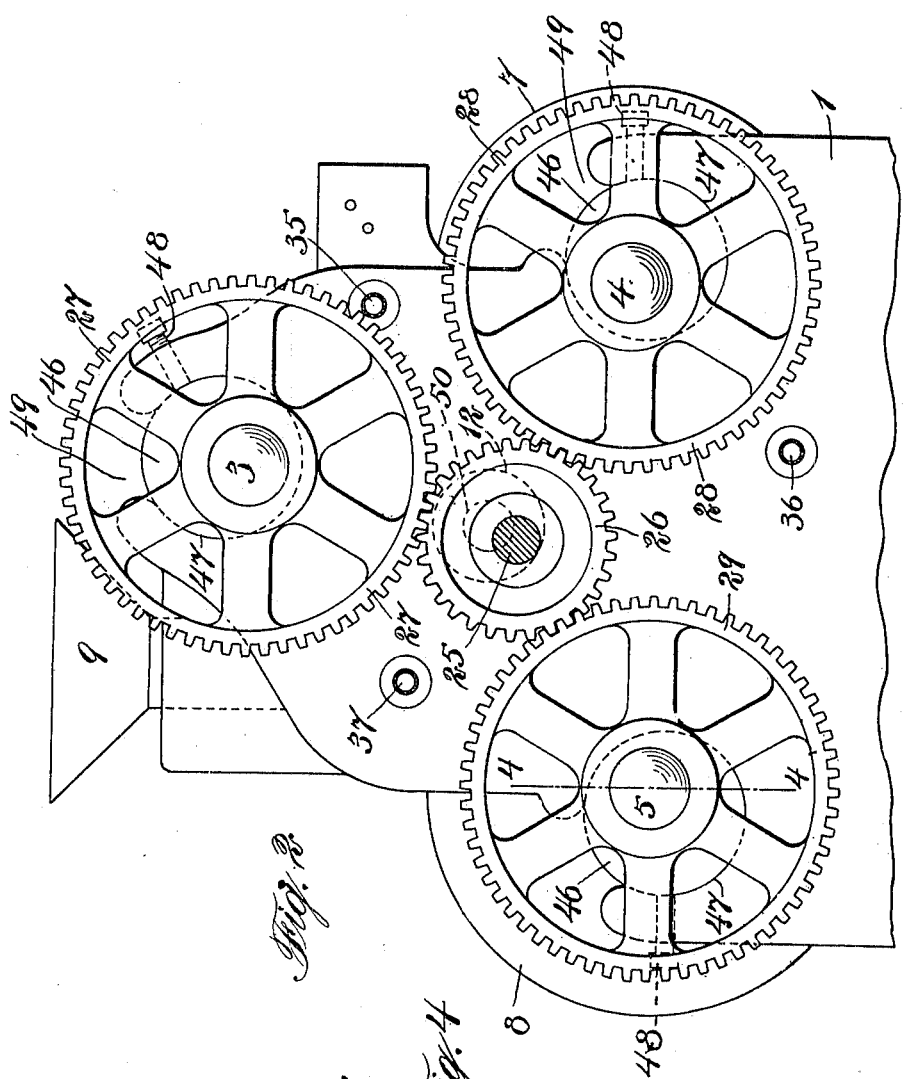
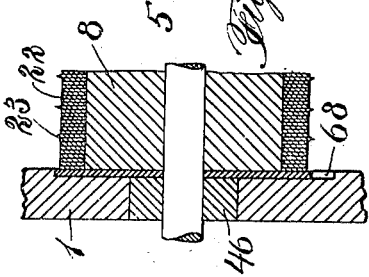
Witnesses:
Fred D. Sweet
A. C. Ratigan
Inventor:
John W. Graves.
by
Attorneys.

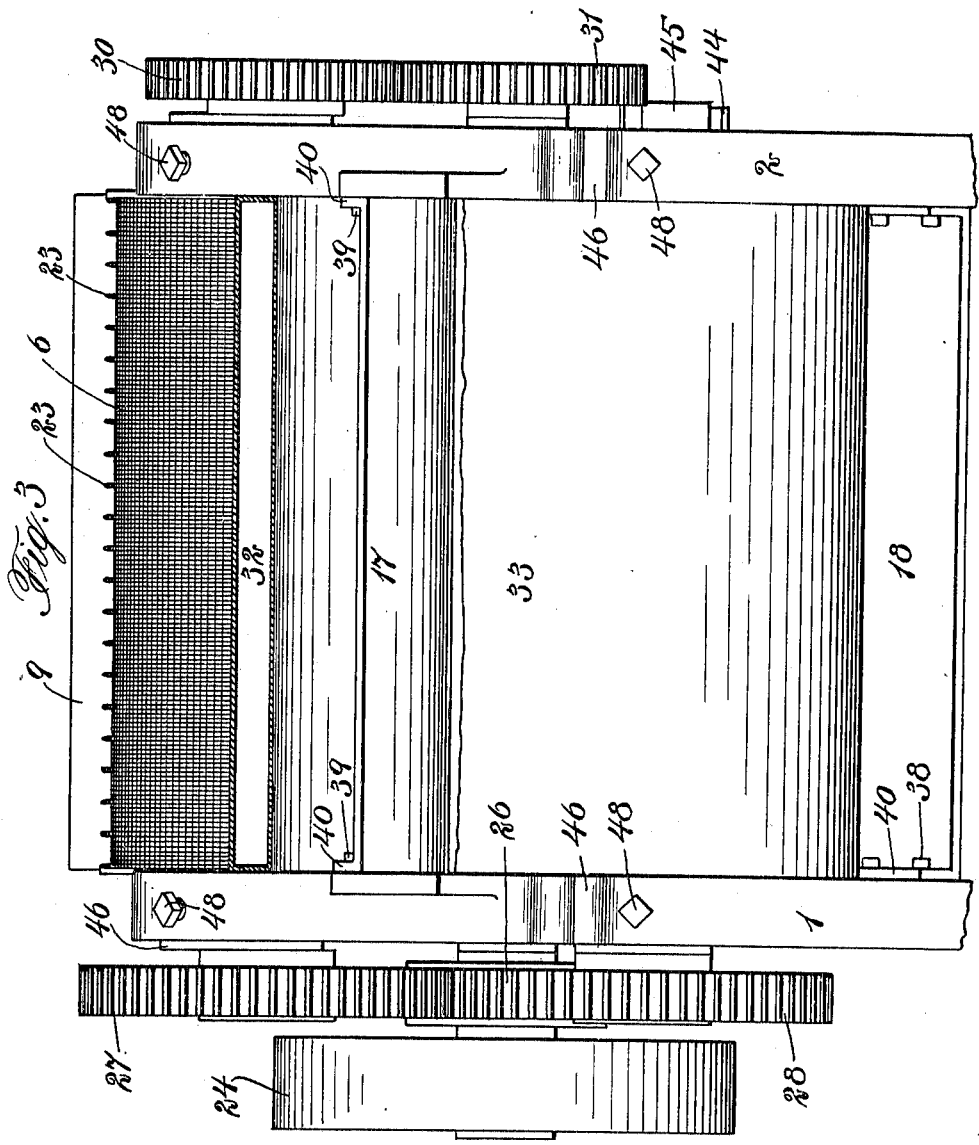

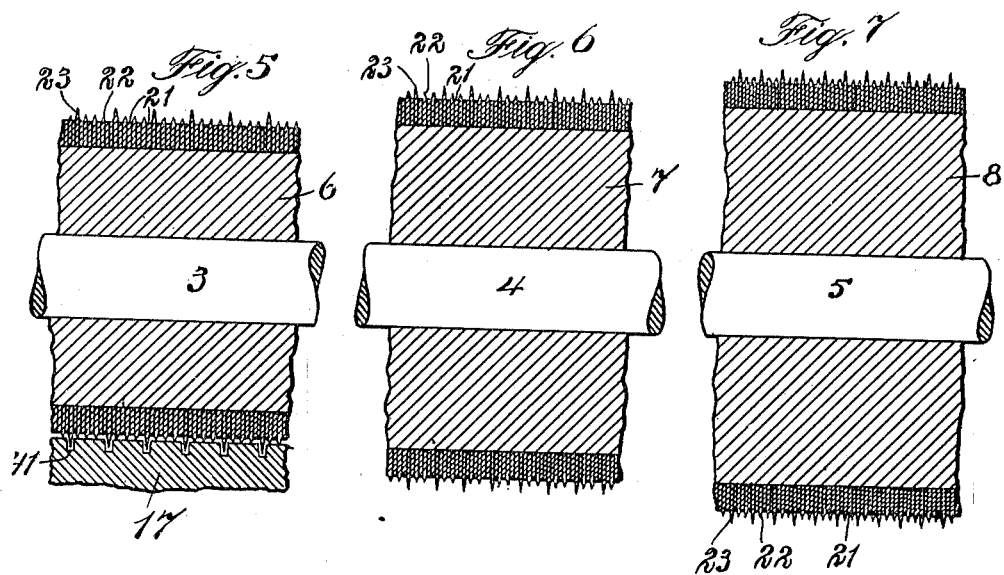

UNITED STATES PATENT OFFICE.

JOHN W. GRAVES, OF WINTHROP, MASSACHUSETTS, ASSIGNOR, BY DIRECT AND MESNE ASSIGNMENTS, OF ONE-TENTH TO JANE BRIDGES, OF NEWBURYPORT, MASSACHUSETTS, AND NINE-TENTHS TO CHARLES F. BROWN, TRUSTEE, OF READING, MASSACHUSETTS.

COTTON-GIN.

1,118,413. Specification of Letters Patent. Patented Nov. 24, 1914.

Application filed February 28, 1906. Serial No. 303,363.

*To all whom it may concern:*

Be it known that I, JOHN W. GRAVES, of Winthrop, in the county of Suffolk and State of Massachusetts, have invented certain new and useful Improvements in Cotton-Gins, of which the following is a specification.

This invention relates to apparatus for removing the cotton fibers from seed cotton and has for its object to provide an improved gin by which, by successive action of successive instrumentalities, differing in construction or principle, upon seed cotton, practically all of the valuable fibers may be removed from the seeds.

Another object is to provide a machine which is simple in construction composed of a comparatively small number of parts.

Accordingly the gin consists of a series of instrumentalities adapted to act in succession upon seed cotton fed into the gin and each being constructed to remove fibers of a certain character, the ginning devices being arranged so as to approximately surround an open space into which the cotton is fed and the feed roll being located in such open space to guide the cotton into proper contact with the ginning devices.

The invention also consists in other improvements and novel details of construction which will be hereinafter more fully described and claimed.

In the drawings forming part of this specification, Figure 1 represents a cross section of the cotton gin embodying the described invention: Fig. 2 represents an end elevation of the same: Fig. 3 represents a side elevation: Fig. 4 represents a fragmentary section on line 4—4 of Fig. 2: Figs. 5, 6 and 7 represent fragmentary longitudinal sections of the ginning cylinders illustrated in Fig. 1: Fig. 8 represents a fragmentary elevation of one of the toothed combing disks and spacing disks.

Similar reference characters indicate the same parts in all the figures.

The machine consists essentially of two end frames or plates 1, 2, between which extend the shafts 3, 4 and 5 of the gin cylinders 6, 7 and 8 respectively.

9 is a hopper from which a passage 10 leads downwardly adjacent the periphery of the first cylinder 6 into a space 11. The side of the passage 10 is opened to admit the combing teeth of cylinder 6 so that the seed cotton is exposed at once to a large portion of the periphery of the cylinder. It will be observed that the gin cylinders are arranged entirely around the space 11 and that within the space is a roller 12 having in its outer surface grooves 13 and ribs 14 extending parallel to its axis. This roll acts as a feeder for the seed cotton and causes it to come into contact with the cylinders one after the other. The gin cylinders all turn in the same direction of rotation indicated by the arrows in Fig 1 and the feed roll is turned in the opposite direction, so that it and the first cylinder 6 crowd the cotton into the portion of the space at the right of the feed roll where it is caught by the cylinder 7 and moved downward to the left until it is forced by the feed roll into contact with the cylinder 8. Thence the seeds, practically stripped of all fiber, fall into the passage 15, which is formed between the periphery of cylinder 8 and a wall 16 and are carried by gravity away from the machine.

17, 18 and 19 represent stripper bars or plates which are located adjacent the peripheries of the several cylinders and serve to prevent the seeds being carried around by the cylinders with the fiber. These stripper plates, together with the peripheries of the cylinders, inclose the space 11.

The cylinders illustrated in Figs. 1, 5, 6 and 7 carry elements for ginning the cotton which have the form of annular disks serrated on their circumferences to form teeth. A section of one of the disks is shown in Fig. 8 on a larger scale, and from this figure it will be seen that the teeth 20 are sharp pointed and substantially conical in form, being without sharp cutting edges. Between the several toothed disks are spacing disks 21 which extend substantially as far as the bases of the teeth 20. In the figures above named there are adjoining disks of two different diameters, the greater number of disks 22 being of the same diameter, while a less number of disks 23 are of greater diameter. These larger disks are spaced at a uniform distance from each other, this distance being greatest in the case of cylinder 6, being less for cylinder 7 and least of all for cylinder 8. On account of this arrangement the teeth on cylinder 6, which act first upon the seed cotton, are enabled to extract the longest and most thickly matted fibers, while the shorter fibers are removed by the other cylinders, the last one taking from the seeds practically all the fiber and lint which is of any use. The cylinders are driven from a belt pulley 24 on a main shaft 25 which carries a pinion 26 meshing simultaneously with spur gears 27, 28 and 29 on the shafts 3, 4 and 5 respectively. In order to attain the best results it is necessary that the cylinders should rotate at substantially increasing peripheral speeds, and to that end I make them of successively increasing diameters, their driving gears being all of the same size. This construction, however, is not essential, and it is obvious that the differences in speed might be made by having the gears 27, 28 and 29 of successively diminishing diameters.

The feed roll 12 is driven from shaft 3 by a spur gear 30 on said shaft which meshes with a gear 31 on a shaft of the roll.

I provide means for removing the fiber from the gin cylinders, these means consisting of pneumatic ducts 32, 33 and 34, one being adjacent each of the cylinders. The ducts are in the form of boxes which extend entirely across the machine from one end of the frame to the other and are supported by the latter. Their ends are shaped to surround openings 35, 36 and 37 respectively in the frames, through which air pipes or nipples may be passed to furnish the supply of air. The sides of the ducts adjacent each of the cylinders are open to permit the air to blow against the cylinders, and they are located so close to the latter that the cotton is removed from the cylinders by the air and conveyed through the ducts to any suitable place of deposit. The product from all the cylinders may be carried to the same receptacle, if desired, or the fiber may be separately conveyed away, the latter procedure being preferred. Since fibers of different lengths and qualities are extracted by the several cylinders, it is convenient to have them separately stored and packed.

The stripper bars extend from end to end of the machine, being secured to the end frames by bolts 38 passing through slots 39 in flanges 40. They extend from their points of attachment approximately tangentially to the surfaces of the several cylinders in directions opposite to the direction of rotation of the cylinders, and are held with their edges as close as possible to the points of the teeth so as to arrest and strip the seeds from the cotton. Notches are formed in the bars to accommodate the disks 23 of larger diameter. The slots 39 permit adjustment of the bars toward and away from the several cylinders.

The wall 16 is pivoted at 42 to the machine frame and has a laterally extending portion 43 which forms the lower boundary of the space 11. Connected to the wall is an arm 44, which extends in position to be engaged by the cam 45 driven in any suitable manner, as by the shaft 4. Whenever the projecting part of the cam strikes the arm, the wall 16 is oscillated toward and from the surface of the cylinder 8, and the part 43 is moved up and down, thereby agitating the cotton and forcing it into closer contact with the last nearer cylinder, so as to insure the most complete possible removal of the fiber from the seeds. In case the cylinder 8 does not remove all the fiber when it first comes in contact with the seeds, the latter are raised until they are engaged again by the roll 13 and may be carried about by the latter into contact again with each of the cylinders, and it is possible for this action to take place until the seeds are entirely stripped when they may fall to the passage 15.

In order to permit adjustment of the ginning cylinders toward and from each other and the feed roll, as well as to permit their easy removal, I mount the shafts of these cylinders in bushings 46 which are held in sockets 47 in the end frames. The bushings are cylindrical, so that they may be rotated and also so that they may be moved in axial direction out of the sockets, and each is held by a set screw 48. The bearings in the bushings for the shafts are eccentric, so that when the bushings are rotated the shafts held therein are moved a greater or less distance from the feed roll. Each of the sockets 47 has an open side or mouth 49, and the shafts of the gin cylinders either in whole or in part are less in width than the width of these openings. Thus, when the bushings are removed from the sockets, it is possible also to remove the gin cylinders by passing their shafts through the openings 49 and without requiring the shafts to be removed from the cylinders or entirely removed from the bushings. The latter are greater in diameter than the openings 49, so that they are unable to slip laterally from the sockets. By this construction it is possible to adjust the ginning cylinders to the exact position required and to move them out of the way or entirely take them out of the machine when access to the interior is necessary, and it is also possible to aline the bearings of the shaft exactly with but a slight amount of labor.

The feed roll 12 is mounted in a somewhat similar manner, although its bearing is not eccentric. This roll is formed with a shaft 50, one end of which rotates in a bearing formed to fit it in one of the frames, while the other end turns in a bearing formed in a cylindrical bushing 51, which is as great in diameter as the greatest thickness or diameter of the roll. The bushing 51 fits in an orifice provided for it in the end plate 2, and may be secured therein in any manner, as by a tap screw 52. When the feed roll is to be removed, the bushing 51 is first loosened, whereupon the roll can be removed endwise through the seat of the bushing.

In case one or more of the teeth on a disk 22 should break, a space might be formed large enough to receive one of the cotton seeds which would permit of seeds being carried through with the fiber, and in order to repair the damage caused by breaking a tooth without requiring the cylinder to be removed and a new disk applied, I have provided spacing disks 21 with notches 53 in their peripheries (as shown in Fig. 8). These notches are somewhat undercut; that is, the openings which they make in the circumference of the disk are less than their greatest width, so that a plastic composition run into them and allowed to harden would be securely held.

When any of the teeth, as, for instance, a tooth 20$^a$, breaks, I make a dam inclosing the space occupied by the broken tooth and into such space pour liquid metal, such as antimony. The metal runs into the notches 53 filling the same, and upon hardening is held securely. The surface is then smoothed off so that it will not extend beyond the ends of the teeth 20, and the cylinder is capable of further use. I prefer to use antimony since this metal has a frictional surface which catches and clings to the cotton fibers.

I claim—

1. A cotton gin comprising a plurality of ginning instrumentalities and a single feeding device centrally arranged with respect to said instrumentalities in combination with guides coöperating with said devices for bringing seed cotton to them successively, said cylinders being arranged each to act only once on the same cotton.

2. A cotton gin comprising a series of cylinders arranged about a central space, a guide arranged to conduct seed cotton into said space and into contact with one of the cylinders, feeding means in said space constructed and operated to bring the cotton into contact with the several cylinders, one after the other, and an outlet at the lower side of said space and substantially equal in length thereto, for conducting the seed away from the space after having been exposed once to the action of each cylinder.

3. A cotton gin comprising a plurality of ginning cylinders arranged so as approximately to surround an intermediate space, provisions for guiding seed cotton into the upper part of said spaces and feeding means therein for bringing the cotton successively into engagement once only with each of the several cylinders.

4. A cotton gin comprising a plurality of ginning cylinders arranged so as approximately to surround an intermediate space, and means in said space for bringing the cotton successively into exclusive engagement with each of the several cylinders once only.

5. A cotton gin comprising a plurality of ginning cylinders one of which is a combing cylinder arranged so as approximately to surround an intermediate space, a guide passage arranged to bring seed cotton, fed thereinto, against one of the cylinders and thence into said space, and a single feeding device and coöperating guiding means in the space for bringing the cotton into contact with the remaining cylinders in succession.

6. A cotton gin comprising a plurality of ginning cylinders one of which is a combing cylinder arranged so as approximately to surround an intermediate space, said space having an inlet and an outlet, and a single feed roll located in said space between the inlet and the outlet thereof for causing seed cotton fed into the space to pass through the space and in so passing to come into contact with the several cylinders in succession.

7. A cotton gin comprising a plurality of ginning cylinders one of which is a combing cylinder arranged so as approximately to surround an intermediate space, a guiding entrance passage for seed cotton having a side open to the first of the cylinders, and opening at its end into said space, and feeding means in the space for guiding the cotton in succession to the other cylinders.

8. A cotton gin comprising a plurality of ginning cylinders one of which is a combing cylinder arranged so as approximately to surround an intermediate space, a guiding entrance passage for seed cotton having a side open to the first of the cylinders, and opening at its end into such intermediate space, feeding means in the space for guiding the cotton in succession to the other cylinders, and a wall adjacent the last cylinder forming therewith an outlet passage for the seeds.

9. A cotton gin comprising frames having sockets in alinement, each socket having a lateral opening of less width than the widest part of the socket, bushings fitting in said sockets, a shaft having portions of less diameter than the width of the socket openings rotarily and eccentrically mounted in the bushings, and a ginning cylinder carried by said shaft.

10. A cotton gin comprising frames having sockets in alinement, each socket having a lateral opening of less width than the widest part of the socket, bushings fitting in said sockets; a shaft having portions of less diameter than the width of the socket openings rotarily and eccentrically mounted in the bushings, and a ginning cylinder carried by said shaft, the bushings being movable axially on the shaft and displaceable in the same direction from the sockets.

11. A cotton gin comprising frames having in alinement circular sockets, each provided with a lateral opening of less width than the diameter of the socket, cylindrical bushings fitting the sockets and displaceable axially therefrom, a shaft having journals of less diameter than the width of the socket openings fitting bearings eccentric in the bushings, and a ginning cylinder carried by the shaft.

12. A cotton gin comprising frames having in alinement circular sockets each provided with a lateral opening of less width than the diameter of the socket, cylindrical bushings rotatably fitting the sockets and displaceable axially therefrom, a shaft having journals of less diameter than the width of the socket openings fitting eccentric bearings in the bushings whereby the shaft may be transversely adjusted by rotation of the bushings, means for securing the bushings in the sockets, and a ginning cylinder carried by the shaft.

In testimony whereof I have affixed my signature, in presence of two witnesses.

JOHN W. GRAVES.

Witnesses:
 ARTHUR H. BROWN,
 A. C. RATIGAN.

Copies of this patent may be obtained for five cents each, by addressing the "Commissioner of Patents, Washington, D. C."